(12) United States Patent
Hundley et al.

(10) Patent No.: US 9,919,489 B2
(45) Date of Patent: Mar. 20, 2018

(54) OPEN CELLULAR SANDWICH STRUCTURE INCLUDING EMBEDDED FASTENERS

(71) Applicant: HRL LABORATORIES, LLC, Malibu, CA (US)

(72) Inventors: Jacob M. Hundley, Newbury Park, CA (US); Eric C. Clough, Santa Monica, CA (US); Alan J. Jacobsen, Woodland Hills, CA (US)

(73) Assignee: HRL Laboratories, LLC, Malibu, CA (US)

( * ) Notice: Subject to any disclaimer, the term of this patent is extended or adjusted under 35 U.S.C. 154(b) by 0 days.

(21) Appl. No.: 15/204,204

(22) Filed: Jul. 7, 2016

(65) Prior Publication Data

US 2016/0311190 A1    Oct. 27, 2016

Related U.S. Application Data

(62) Division of application No. 14/226,801, filed on Mar. 26, 2014, now Pat. No. 9,457,537.

(Continued)

(51) Int. Cl.
*B32B 3/06* (2006.01)
*E04C 2/292* (2006.01)
(Continued)

(52) U.S. Cl.
CPC ............ *B32B 3/06* (2013.01); *B29C 64/129* (2017.08); *B32B 3/266* (2013.01); *B32B 5/20* (2013.01); *B32B 7/08* (2013.01); *B32B 27/08* (2013.01); *B32B 27/36* (2013.01); *B33Y 10/00* (2014.12); *B33Y 80/00* (2014.12); *C08J 3/28* (2013.01); *E04C 2/292* (2013.01); *E04C 2/296* (2013.01); *B29K 2105/0002* (2013.01); *B29K 2105/0058* (2013.01); *B29L 2009/00* (2013.01); *B29L 2011/0075* (2013.01); *B32B 2250/02* (2013.01);
(Continued)

(58) Field of Classification Search
CPC .................................. A44B 18/0011
USPC .......................................... 428/99
See application file for complete search history.

(56) References Cited

U.S. PATENT DOCUMENTS

| 7,382,959 B1 | 6/2008 | Jacobsen |
| 7,653,279 B1 | 1/2010 | Jacobsen |
| 2008/0127594 A1 | 6/2008 | Kennedy |

FOREIGN PATENT DOCUMENTS

| EP | 0264870 A1 | 4/1988 |
| EP | 0461299 A1 | 12/1991 |

(Continued)

OTHER PUBLICATIONS

International Search Report and Written Opinion for International Application No. PCT/US2015/012069; dated Apr. 30, 2015, 18 pages.

*Primary Examiner* — Brent T O'Hern
(74) *Attorney, Agent, or Firm* — Lewis Roca Rothgerber Christie, LLP (57) ABSTRACT

A sandwich structure including at least one fastener attached to a first facesheet, an ordered three-dimensional microstructure core defined by a series of interconnected polymer waveguides around the at least one fastener and attached to the first facesheet, and a second facesheet attached to the ordered three-dimensional microstructure core. The ordered three-dimensional microstructure core is sandwiched between the first facesheet and the second facesheet.

9 Claims, 8 Drawing Sheets

Related U.S. Application Data (60) Provisional application No. 61/909,293, filed on Nov. 26, 2013.

(51) Int. Cl.
- *E04C 2/296* (2006.01)
- *B32B 27/08* (2006.01)
- *B32B 27/36* (2006.01)
- *B32B 3/26* (2006.01)
- *B32B 5/20* (2006.01)
- *C08J 3/28* (2006.01)
- *B33Y 10/00* (2015.01)
- *B33Y 80/00* (2015.01)
- *B32B 7/08* (2006.01)
- *B29C 64/129* (2017.01)
- *B29K 105/00* (2006.01)
- *B29L 9/00* (2006.01)
- *B29L 11/00* (2006.01)

(52) U.S. Cl.
CPC ....... *B32B 2250/40* (2013.01); *B32B 2255/26* (2013.01); *B32B 2307/518* (2013.01); *B32B 2605/00* (2013.01)

(56) References Cited

FOREIGN PATENT DOCUMENTS

| | | |
|---|---|---|
| JP | 2001-140362 A | 5/2001 |
| KR | 10-2009-0038628 A | 6/2010 |
| KR | 10-1153303 B1 | 6/2012 |
| KR | 101153303 B1 * | 6/2012 |
| WO | WO 2004/063572 A2 | 7/2004 |
| WO | WO 2009/083645 A1 | 7/2009 |

* cited by examiner

OPEN CELLULAR SANDWICH STRUCTURE INCLUDING EMBEDDED FASTENERS

CROSS-REFERENCE TO RELATED APPLICATION

This application is a divisional of U.S. patent application Ser. No. 14/226,801, filed Mar. 26, 2014, which issued as U.S. Pat. No. 9,457,537, and which claims priority to and the benefit of U.S. Provisional Application No. 61/909,293, filed Nov. 26, 2013, the entire contents of each of which are incorporated herein by reference.

FIELD

The present invention is directed to sandwich structures and, more particularly, methods of embedding fasteners in open cellular sandwich structures.

BACKGROUND

Sandwich structures commonly include a pair of thin and rigid facesheet materials separated by a lightweight reinforcing core. Sandwich structures are widely used as structural components in both advanced aerospace and automotive designs due to their high specific strength and stiffness. Conventionally, the lightweight reinforcing core includes a closed-cell material, such as balsa wood, honeycomb, or closed-cell foam. Additionally, a series of holes are commonly drilled or otherwise machined through the core and one or more of the sandwich facesheets such that the sandwich structure may be connected to surrounding structures or subsystems by a series of fasteners. However, drilling holes through sandwich core materials, either open or closed cell, may damage the core. Alternatively, conventional methods for embedding fasteners in a sandwich structure while maintaining the structural integrity of the core are time-consuming and costly.

Additionally, conventional core materials have a compression strength that is significantly less than the facesheets, which limits the amount of torque that can be applied to the fasteners connecting the sandwich structure to a surrounding structure or subsystem (i.e., over-torquing the fasteners may disadvantageously collapse the core). Furthermore, conventional core materials (e.g., honeycomb or foam) cannot be threaded, and therefore the fasteners connecting the sandwich structure to a surrounding structure or subsystem can only transmit mechanical loads through the facesheets (i.e., because conventional core materials are designed to be lightweight, and thus have a low ratio of reinforcing material to air, the fasteners extending through the core are inefficient at transmitting mechanical loads because of the minimal contact area between the fasteners and the core). Moreover, machining fastener holes in the facesheets introduces a potential fluid leak path (i.e., the fastener holes break the continuity of the facesheets and allow for fluid to leak into or out of the core through the fastener holes). Accordingly, the fastener holes must be sealed to prevent fluid ingress into the core, which otherwise may degrade or corrode the core. Sealing of the fasteners is also a concern when a conventional sandwich structure is adapted to be used in a multi-function manner, such as for acoustic isolation, active heating or cooling, and/or fluid storage (e.g., a structural fuel tank).

SUMMARY

The present disclosure is directed to various methods for embedding fasteners in sandwich structures having an open cellular microstructure core provided between a pair of facesheets. In one embodiment, the method includes attaching at least one fastener to a first facesheet by any suitable process. The method also includes irradiating a volume of photo-monomer in a reservoir with light beams to form an ordered three-dimensional microstructure core around the at least one fastener. The method further includes attaching a second facesheet to the ordered three-dimensional microstructure core to form the sandwich structure. Irradiating the volume of photo-monomer may couple the ordered three-dimensional micro-structure core to the at least one fastener. The light may have any suitable wavelength, such as collimated ultraviolet light.

The task of irradiating the volume of photo-monomer may include directing a series of light beams through a first series of apertures in a mask covering the reservoir and directing a plurality of light beams through a second plurality of apertures in the mask surrounding the at least one fastener, wherein spacing between the apertures of the first series of apertures is greater than spacing between the apertures of the second series of apertures. The task of irradiating the volume of photo-monomer may include irradiating a first region of the volume of photo-monomer surrounding the at least one fastener with light beams at a first angular orientation to create a first region of the ordered three-dimensional microstructure core defined by interconnected polymer optical waveguides oriented along the first angular orientation and irradiating a second region of the volume of photo-monomer with light beams at a second angular orientation to create a second region of the ordered three-dimensional microstructure core defined by interconnected polymer optical waveguides oriented along the second angular orientation that is different than the first angular orientation. The task of irradiating the volume of photo-monomer may include irradiating a first region of the volume of photo-monomer surrounding the at least one fastener to create a first region of the ordered three-dimensional microstructure core defined by a first density of interconnected polymer waveguides and irradiating a second region of the volume of photo-monomer to create a second region of the ordered three-dimensional microstructure core defined by a second density of interconnected polymer waveguides that is less than the first density of polymer waveguides. The task of irradiating the photo-monomer reservoir may include directing a series of light beams through a series of apertures in a mask covering the reservoir.

The fastener may be any suitable kind of fastener, such as an externally threaded stud or an internally threaded insert. In one embodiment, the method includes applying a release agent to the externally threaded stud to prevent the ordered three-dimensional microstructure core from adhering to the externally threaded stud. In another embodiment, the method includes inserting a spacer over the externally threaded stud before the task of irradiating the volume of photo-monomer with the light beams to prevent the ordered three-dimensional microstructure core from adhering to the externally threaded stud, removing the spacer after the task of irradiating the volume of photo-monomer with the light beams to form a void around the externally threaded stud, and inserting an internally threaded fastener into the void to connect the externally threaded stud to another component.

The method may also include removing unpolmerized photo-monomer from the reservoir before attaching the second facesheet to the ordered three-dimensional microstructure core. The method may further include forming apertures in the second facesheet aligned with the fasteners.

The method may also include sealing a periphery of the ordered three-dimensional microstructure core.

In one embodiment, the method of embedding at least one fastener in a sandwich structure includes attaching the at least one fastener to a first facesheet defining at least one opening aligned with the at least one fastener, irradiating a volume of photo-monomer in a reservoir with light beams to form an ordered three-dimensional microstructure core around the at least one fastener, and attaching a second facesheet to the ordered three-dimensional microstructure core to form the sandwich structure. The fastener may be any suitable kind of fastener, such as an internally threaded standoff or a smooth bore standoff. The light may have any suitable wavelength, such as collimated ultraviolet light.

The method may also include sealing the at least one fastener with a sealing compound to block the photo-monomer from leaking out of the reservoir through the at least one fastener. In one embodiment, the method also includes forming at least one opening in the second facesheet aligned with the at least one fastener and the at least one opening in the first facesheet.

The task of irradiating the volume of photo-monomer may include irradiating a first region of the volume of photo-monomer surrounding the at least one fastener with light beams at a first angular orientation to create a first region of the ordered three-dimensional microstructure core defined by interconnected polymer optical waveguides oriented along the first angular orientation and irradiating a second region of the volume of photo-monomer with light beams at a second angular orientation to create a second region of the ordered three-dimensional microstructure core defined by interconnected polymer optical waveguides oriented along the second angular orientation that is different than the first angular orientation. The task of irradiating the volume of photo-monomer may include irradiating a first region of the volume of photo-monomer surrounding the at least one fastener to create a first region of the ordered three-dimensional microstructure core defined by a first density of interconnected polymer waveguides and irradiating a second region of the volume of photo-monomer to create a second region of the ordered three-dimensional microstructure core defined by a second density of interconnected polymer waveguides that is less than the first density of polymer waveguides. In one embodiment, irradiating the volume of photo-monomer includes directing a series of light beams through a first series of apertures in a mask covering the reservoir and directing a series of light beams through a second series of apertures in the mask surrounding the at least one fastener. In one embodiment, the spacing between the first series of apertures is greater than the spacing between the second series of apertures. In one embodiment, irradiating the volume of photo-monomer includes directing a first series of light beams through a first series of apertures in a mask covering the reservoir and directing a second series of light beams through a second series of apertures in the mask surrounding the at least one fastener. In one embodiment, the number of light beams in the second series of light beams is greater than the number of light beams in the first series of light beams. In another embodiment, the angle formed between the light beams and an imaginary axis perpendicular to the surface of the mask in the second series of light beams is greater than the angle formed by the first series of light beams.

The present disclosure is also directed to various embodiments of a sandwich structure having one or more embedded fasteners. In one embodiment, the sandwich structure include at least one fastener attached to a first facesheet, an ordered three-dimensional microstructure core defined by a series of interconnected polymer waveguides around the at least one fastener, and a second facesheet attached to the ordered three-dimensional microstructure core. The ordered three-dimensional microstructure core is sandwiched between the first facesheet and the second facesheet. The three-dimensional microstructure core may have a first region defined by a first density of interconnected polymer waveguides surrounding the at least one fastener and a second region defined by a second density of interconnected polymer waveguides. The three-dimensional microstructure core may have a first region defined by a first angular orientation of interconnected polymer optical waveguides surrounding the at least one fastener and a second region defined by a second angular orientation of interconnected polymer optical waveguides different than the first angular orientation. The ordered three-dimensional microstructure core may be coupled to the at least one fastener.

This summary is provided to introduce a selection of concepts that are further described below in the detailed description. This summary is not intended to identify key or essential features of the claimed subject matter, nor is it intended to be used in limiting the scope of the claimed subject matter.

BRIEF DESCRIPTION OF THE DRAWINGS

These and other features and advantages of embodiments of the present disclosure will become more apparent by reference to the following detailed description when considered in conjunction with the following drawings. In the drawings, like reference numerals are used throughout the figures to reference like features and components. The figures are not necessarily drawn to scale.

DETAILED DESCRIPTION

The present disclosure is directed to various methods of embedding fasteners in a sandwich structure having an open cellular core provided between a pair of facesheets. In one or more embodiments, the method of embedding fasteners in the sandwich structure does not require machining of the core. Additionally, in one or more embodiments, the method of embedding fasteners in the sandwich structure allows a full length of the embedded fasteners extending through the sandwich structure to carry and transmit mechanical loads. Moreover, in one or more embodiments, the method of embedding fasteners in the sandwich structure is performed concurrently with fabrication of the sandwich structure itself.

A method according to one embodiment of the present disclosure includes embedding one or more captive fasteners 100 into a sandwich structure 101 having an upper facesheet 102, a lower facesheet 103 spaced apart from the upper facesheet 102, and a reinforcing core 104 disposed between the upper and lower facesheets 102, 103, respectively. As described in more detail below, the reinforcing core 104 is an open cellular ordered three-dimensional polymer microstructure core having a plurality of interconnected polymer optical waveguides 105.

Figure 1:
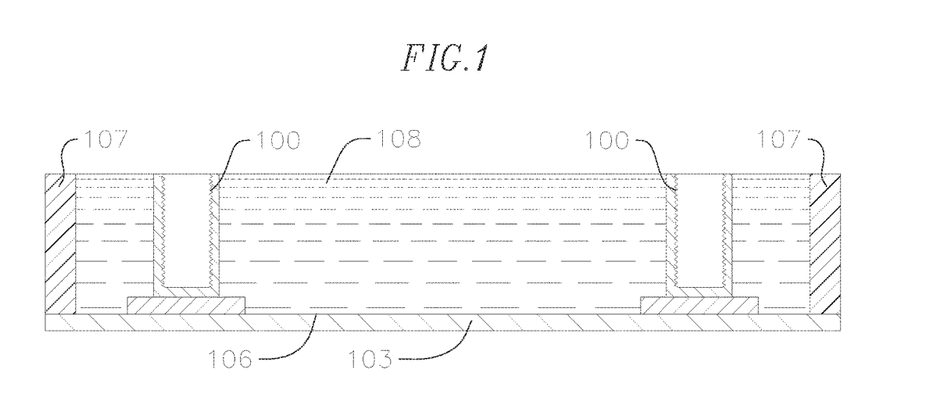
FIG. 1 illustrates a task of attaching one or more captive fasteners to a lower facesheet and a task of filling a reservoir with a volume of liquid photo-monomer according to one embodiment of the present disclosure.

With reference now to the embodiment illustrated in FIG. 1, the method includes a task of attaching the one or more captive fasteners 100 to an inner surface 106 of the lower facesheet 103. As used herein, the term fastener refers to any suitable type of fastener, such as, for instance, bolts, rivets, screws, threaded rods, pins, or anchors, unless specifically identified otherwise. In the embodiment illustrated in FIG. 1, the one or more captive fasteners 100 are internally threaded inserts (e.g., M8 weld nuts). The task of attaching the one or more captive fasteners 100 to the inner surface 106 of the lower facesheet 103 may be performed by any suitable process, such as, for instance, welding (e.g., inert gas welding, stick welding, arc welding, ultrasonic welding, linear friction welding, vibration welding, or friction-stir welding), brazing, bonding, or any combination thereof. In one embodiment, the method may not include a task of attaching the one or more captive fasteners 100 to the lower facesheet 103 (e.g., the one or more captive fasteners 100 may be merely supported on the lower facesheet 103). The lower facesheet 103 may have any suitable shape, such as, for instance, square, rectangular, circular, or even an irregular shape. The lower facesheet 103 may have any suitable thickness, such as, for instance, from approximately 0.03 inches to approximately 0.25 inches, depending upon the intended application of the sandwich structure 101. Although the lower facesheet 103 in the illustrated embodiment is flat, in one or more alternate embodiments the lower facesheet 103 may be non-planar. Additionally, the lower facesheet 103 may be formed from any suitable material, such as, for instance, aluminum, steel, other metal alloys, carbon fiber reinforced plastic, unreinforced plastic, or any combination thereof.

With continued reference to the embodiment illustrated in FIG. 1, the method of embedding the one or more captive fasteners 100 in the sandwich structure 101 also includes a task of forming a mold or reservoir 107 around a periphery of the lower facesheet 103 and filling the reservoir 107 with a volume of liquid photo-monomer 108 that is configured to polymerize when exposed to light within a particular range of wavelengths, such as, for instance, ultraviolet light (i.e., wavelengths between 250 nm and 400 nm). The liquid photo-monomer 108 may be any suitable type of monomer configured to polymerize when exposed to light, such as, for instance, urethanes (e.g., polyurethanes), acrylates, methacrylates, or cationic polymers (e.g., photo-cured epoxies).

Figure 2:
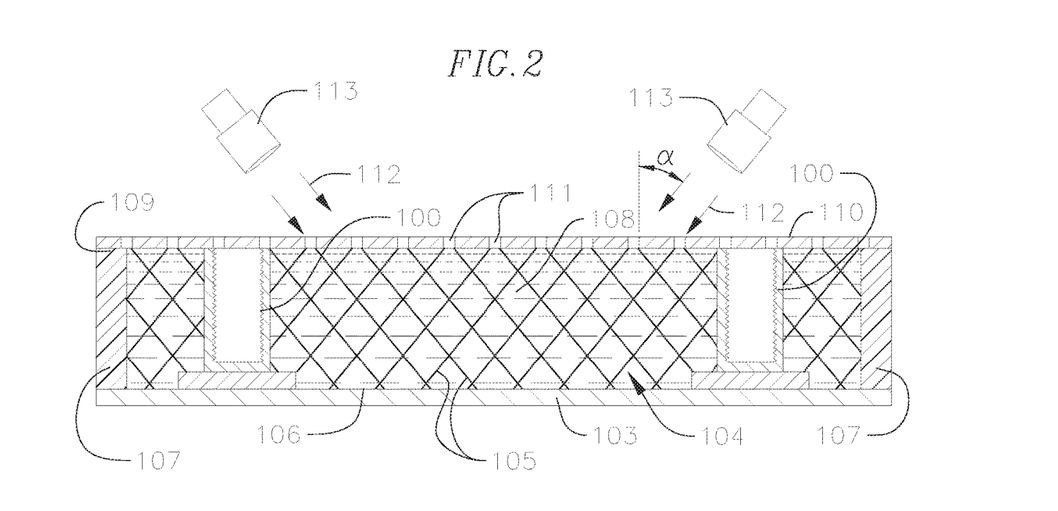
FIG. 2 illustrates a task of irradiating a volume of liquid photo-monomer with one or more light beams according to one embodiment of the present disclosure.

With reference now to the embodiment illustrated in FIG. 2, the method also includes a task of covering an upper end 109 of the reservoir 107 with a mask 110. The mask 110 defines at least one light-transmitting aperture 111. The mask 110 may define any desired number of apertures 111 and the apertures 111 may have any desired shape, depending upon the desired characteristics of the reinforcing core 104, as described below in more detail. Additionally, the mask 110 may be made of any suitable material, such as, for instance, biaxially-oriented polyethylene terephthalate.

Still referring to the embodiment illustrated in FIG. 2, the method also includes a task of irradiating the volume of photo-monomer 108 in the reservoir 107 with light beams 112 (e.g., collimated or substantially collimated ultraviolet light beams) from one or more light sources 113. The task of irradiating the photo-monomer 108 includes directing the collimated light beams 112 from the one or more light sources 113 through the one or more apertures 111 in the mask 110. Regions of the liquid photo-monomer 108 that are exposed to the collimated light beams 112 cure (i.e., polymerize). Moreover, the index of refraction of the polymerized regions differs from the index of refraction of the unpolymerized liquid photo-monomer 108. This index of refraction difference between the polymerized regions and unpolymerized photo-monomer 108 tends to "trap" and "focus" the collimated light beams 112 to a tip of the polymerized regions, which causes the polymerized regions to grow and propagate through the volume of photo-monomer 108 to form polymerized optical waveguides 105. That is, the difference between the index of refraction of the liquid photo-monomer 108 and the polymerized regions causes the collimated light beams 112 to internally reflect and focus at the tips of the polymerized regions, which causes the photo-monomer 108 near the tips of the polymerized regions to polymerize. This process continues such that the polymerized regions propagate down through the volume of photo-monomer 108 and form the polymer optical waveguides 105. Suitable methods for forming polymer optical waveguides 105 are described in U.S. Pat. Nos. 7,653,279 and 7,382,959, the entire content of both of which are incorporated herein by reference.

The direction in which the polymer optical waveguides 105 propagate through the volume of photo-monomer 108 is a function of an incident angle α of the one or more light sources 113, and the light beams 112 produced therefrom, relative to an imaginary axis perpendicular to the upper facesheet 102 (i.e., the orientation of the polymer optical waveguides 105 is a function of the angles α at which the one or more collimated light beams 112 strike the volume of photo-monomer 108 in the reservoir 107). Accordingly, in one embodiment, the method may include a task of positioning the one or more light sources 113 at a first incident angle $\alpha_1$ and directing one or more light beams 112 through the apertures 111 in the mask 110 at the first incident angle $\alpha_1$ to form polymer optical waveguides 105 extending along the first incident angle $\alpha_1$. The method may also include a task of repositioning the one or more light sources 113 to a second incident angle $\alpha_2$ and directing one or more collimated light beams 112 through the apertures 111 in the mask 110 at the second incident angle $\alpha_2$ to form polymer optical waveguides 105 extending along the second incident angle $\alpha_2$. In one embodiment, the method also includes repositioning the light sources 113 to third and fourth incident angles $\alpha_3$, $\alpha_4$, respectively, to form polymer optical waveguides 105 extending along the third and fourth incident angles $\alpha_3$, $\alpha_4$, respectively. In one embodiment, the incident angles $\alpha_1$, $\alpha_2$, $\alpha_3$, $\alpha_4$, are each approximately 45 degrees. Additionally, in one embodiment, the method includes positioning the light sources 113 around an imaginary axis perpendicular to the upper facesheet 102 (e.g., positioning each of the light sources 113 at approximately 90 degree increments revolved around an imaginary axis perpendicular to the upper facesheet 102). In one or more alternative embodiments, the method may include positioning the light sources 113 at any other desired angles. Additionally, although in one embodiment the method includes repositioning the one or more light sources 113 into four different incident angle positions $\alpha_1$, $\alpha_2$, $\alpha_3$, $\alpha_4$, it will be appreciated that the method may include positioning the light sources 113 into any suitable number of different incident angles $\alpha$, such as, for instance, from two to ten different angular positions, and still fall within the scope and spirit of the present disclosure. In the illustrated embodiment, the polymer optical waveguides 105 cross or intersect each other and are polymerized together into a single, unitary lattice microstructure. Together, the polymer optical waveguides 105 define the open cellular ordered three-dimensional polymer microstructure core 104 of the sandwich structure 101.

In another embodiment, the method may include placing a plurality of fixed light sources 113 at different incident angles $\alpha$, such as, for instance, at four different angles, and directing the light beams 112 into the volume of photo-monomer 108 in the reservoir 107 through the one or more apertures 111 in the mask 110. Accordingly, it will be appreciated that the polymer optical waveguides 105 may be formed by one or more fixed position light sources 113, one or more repositionable light sources 113, or a combination of fixed position and repositionable light sources 113. The light sources 113 may be any suitable kind of lamps capable of emitting light beams 112 within a range of wavelengths configured to polymerize the liquid photo-monomer 108, such as, for instance, a mercury arc lamp.

With continued reference to the embodiment illustrated in FIG. 2, the length to which the polymer optical waveguides 105 propagate through the volume of photo-monomer 108 in the reservoir 107 is a function of several factors, including the size, intensity, and exposure time of the incident light beams 112 and the light absorption/transmission properties of the liquid photo-monomer 108. Accordingly, in one embodiment, the method includes a task of selecting one or more light sources 113 configured to produce light beams 112 having a suitable intensity and exposing the volume of photo-monomer 108 in the reservoir 107 to the light beams 112 for a sufficient duration such that the polymer optical waveguides 105 propagate all the way down through the reservoir 107 and adhere to the inner surface 106 of the lower faceplate 103. Additionally, in one embodiment, the polymer optical waveguides 105 propagate through the volume of photo-monomer 108 in the reservoir 107 and adhere to an outer surface of one or more of the captive fasteners 100. In this manner, the polymer optical waveguides 105 are coupled to the one or more captive fasteners 100 (i.e., the open cellular ordered three-dimensional polymer microstructure core 104 is coupled to the one or more captive fasteners 100). In one embodiment in which the reservoir 107 has a depth of approximately 6 mm, the method includes irradiating the volume of photo-monomer 108 with UV light beams 112 having an intensity of 3 mW/cm$^2$ for approximately or about 100 seconds. It will be appreciated, however, that the method may include selecting one or more light sources 113 configured to produce light beams 112 having any other suitable intensity and irradiating the photo-monomer 108 for any other suitable duration depending upon the depth of the reservoir 107 and the desired length of the polymer optical waveguides 105.

The cross-sectional shape and size of the polymer optical waveguides 105 is a function of the shape and size of the collimated light beams 112, which in turn are dependent upon the shape and size of the apertures 111 in the mask 110. The apertures 111 in the mask 110 may have any desired shape, such as, for instance, triangular, pentagonal, hexagonal, polygonal, oval, or star-shaped. Accordingly, the method may also include a task of selecting a mask 110 having apertures 111 with a shape and size corresponding to the desired cross-sectional shape and size of the polymer optical waveguides 105 of the core 104.

The spacing between the apertures 111 in the mask 110 and the number of collimated light beams 112 directed through the apertures 111 will determine the density of the polymer optical waveguides 105 and the open volume fraction of the core 104 (i.e., the volume ratio of air to polymer optical waveguides 105 in the core 104). In one embodiment, the method includes a task of creating one or more relatively higher density regions 114 (see FIG. 10) of polymer optical waveguides 105 surrounding the one or more captive fasteners 100 and one or more relatively lower density regions 115 (see FIG. 10) of polymer optical waveguides 105 spaced apart from the captive fasteners 100 (i.e., a task of creating a core 104 wherein localized regions 114 of the core 104 surrounding the captive fasteners 100 have a higher density of polymer optical waveguides 105 than other regions 115 of the core 104).

Figure 3:
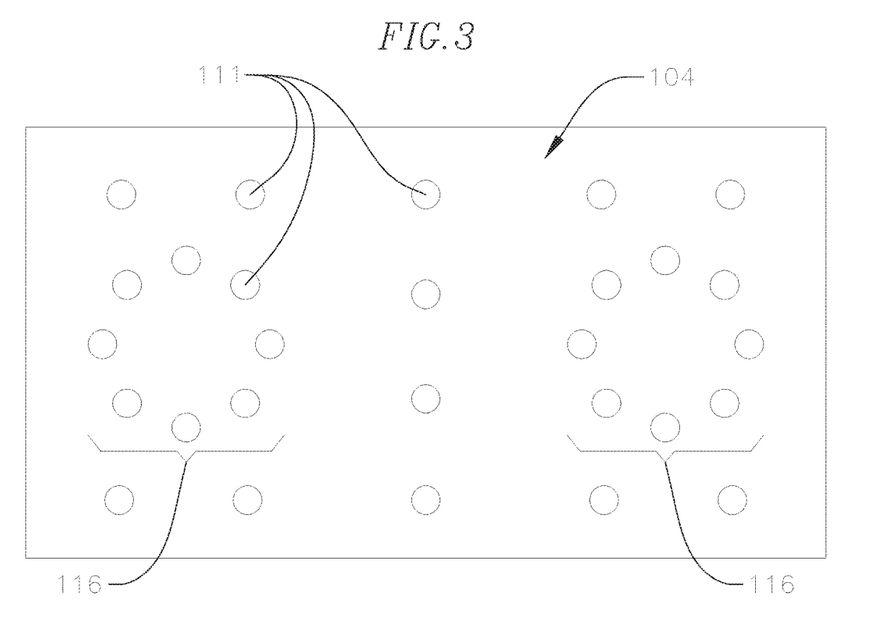
FIGS. 3-4 illustrate masks according to various embodiments of the present disclosure.

In one embodiment, the task of creating one or more higher density regions 114 of polymer optical waveguides 105 surrounding the captive fasteners 100 may include a task of selecting a mask 110 having one or more sets 116 of apertures 111 that are more closely spaced together than the remainder of the apertures 111 in the mask 110, as illustrated in FIG. 3. The apertures 111 in the sets 116 are configured to surround the captive fasteners 100 when the mask 110 is placed on the upper end 109 of the reservoir 107, as illustrated in FIG. 2. More closely spacing the apertures 111 in the mask 110 around the locations of the one or more captive fasteners 100 is configured to facilitate producing higher density regions 114 of polymer optical waveguides 105 surrounding the one or more captive fasteners 100 by creating a greater density of apertures 111 surrounding the captive fasteners 100. The greater density of apertures 111 surrounding the captive fasteners 100 is configured to achieve a greater density of polymer optical waveguides 105 surrounding the captive fasteners 100 when the one or more light sources 113 direct collimated light beams 112 into the volume of photo-monomer 108 through the apertures 111 in the mask 110.

Figure 4:
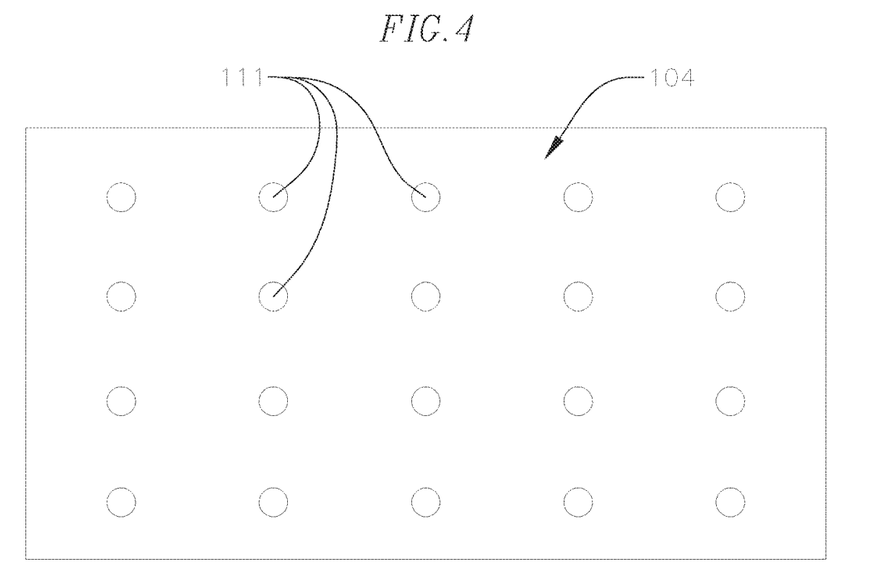

In another embodiment, the task of creating one or more higher density regions 114 of polymer optical waveguides 105 surrounding the captive fasteners 100 may include a task of selecting a mask 110 having a uniform, equidistant pattern of apertures 111, such as the mask 110 illustrated in FIG. 4, and directing a greater number of collimated light beams 112 through the apertures 111 surrounding the one or more captive fasteners 100 than through the other apertures 111 in the mask 110. In another embodiment, the task of creating the one or more higher density regions 114 of polymer optical waveguides 105 surrounding the captive fasteners 100 may include a combination of selecting a mask 110 having one or more sets 116 of closely spaced apertures 111 surrounding the captive fasteners 100 and directing a greater number of collimated light beams 112 through the one or more sets 116 of apertures 111 surrounding the captive fasteners 100. In another embodiment, the task of creating the one or more higher density regions 114 of polymer optical waveguides 105 surrounding the captive fasteners 100 may include changing the orientation a of the light beams 112 passing through the apertures 111 in the mask 110 in the vicinity of the captive fasteners 100.

The higher density regions 114 of polymer optical waveguides 105 surrounding the one or more captive fasteners 100 are configured to increase the stiffness and strength of the core 104 to enable the core 104 to handle greater mechanical loads transmitted through the captive fasteners 100. Additionally, increasing the density of the core 104 only in localized regions 114 surrounding the captive fasteners 100 minimizes or at least reduces the overall weight of the core 104 compared to an otherwise equivalent core 104 that is uniformly strengthened over the entire volume of the sandwich structure 101. Although in one embodiment the core 104 may be strengthened around each of the captive fasteners 100, in one or more alternate embodiments, the core 104 may be strengthened around less than all of the captive fasteners 100, such as, for instance, around only those captive fasteners 100 which are expected to transmit mechanical loads exceeding a certain threshold.

Figure 5:
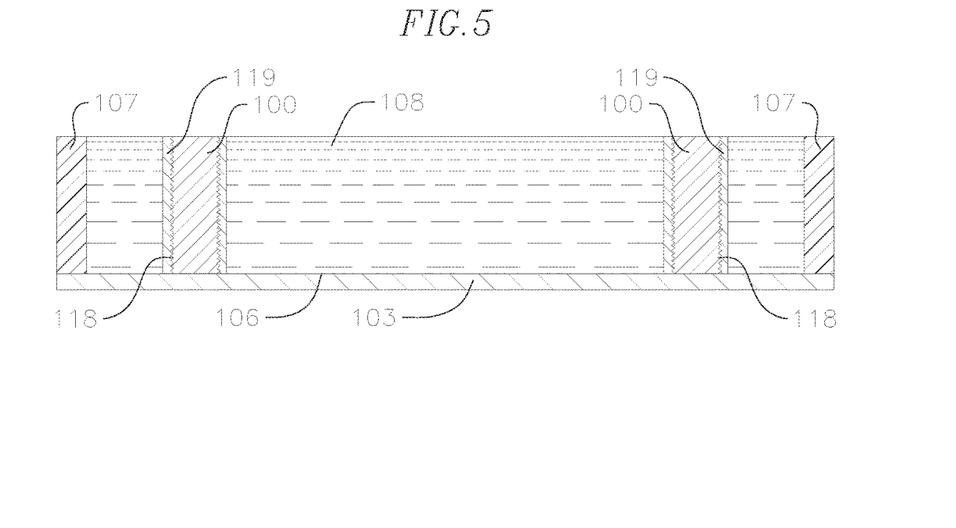
FIG. 5 illustrates a task of attaching one or more captive fasteners to a lower facesheet, a task of filling a reservoir with a volume of liquid photo-monomer, and a task of inserting one or more spacers over the captive fasteners according to another embodiment of the present disclosure.

In an embodiment in which the one or more captive fasteners 100 are externally threaded fasteners, as illustrated in FIG. 5, the method of embedding the one or more externally threaded fasteners 100 in the sandwich structure 101 may include a task of applying a release agent 118 to the externally threaded fasteners 100 before the task of irradiating the volume of liquid photo-monomer 108 with one or more collimated light beams 112. The task of applying the release agent 118 to the externally threaded fasteners 100 prevents or effectively prevents the polymer optical waveguides 105 from adhering to the externally threaded fasteners 100. Otherwise, adhesion between the polymer optical waveguides 105 and the externally threaded fasteners 100 may impede or prevent attachment of other matching, internally threaded fasteners to the externally threaded fasteners 100, such as, for instance, to attach the sandwich structure 101 to another structural component or subsystem.

Figure 6:
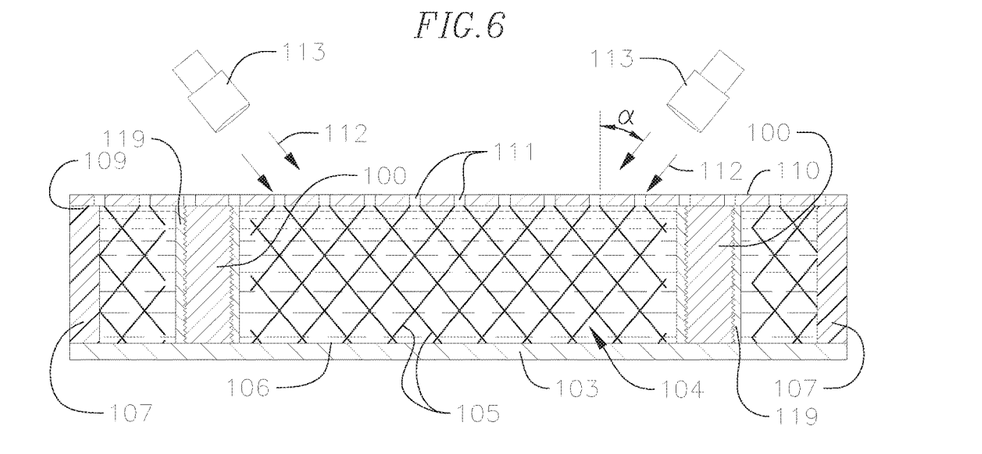
FIG. 6 illustrates a task of irradiating a volume of liquid photo-monomer with one or more light beams and a task of removing the one or more spacers according to one embodiment of the present disclosure.

In another embodiment in which the one or more captive fasteners 100 are externally threaded fasteners 100, the method may include a task of inserting a spacer 119 over each of the externally threaded fasteners 100, as illustrated in FIG. 5, before the task of irradiating the volume of liquid photo-monomer 108 with the one or more collimated light beams 112. The task of inserting a spacer 119 over each of the externally threaded fasteners 100 prevents or effectively prevents the polymer optical waveguides 105 from adhering to the externally threaded fasteners 100. In one embodiment, the method also includes a task of removing each of the spacers 119 around the externally threaded fasteners 100 after the task of irradiating the volume of photo-monomer 108 with one or more collimated light beams 112. Removing the spacers 119 from the externally threaded fasteners 100 creates voids 120 around the externally threaded fasteners 100 separating the core 104 from the externally threaded fasteners 100, as illustrated in FIG. 6, such that other fasteners may engage the externally threaded fasteners 100, such as, for instance, to attach the sandwich structure 101 to another structural component or subsystem (e.g., a structural component of an aerospace or automotive vehicle).

Figure 7:
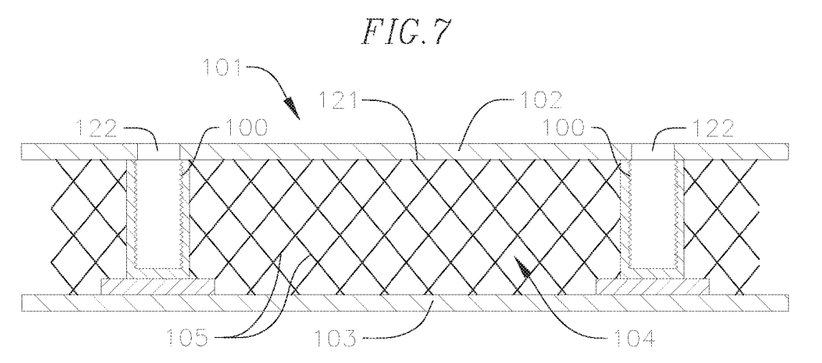
FIGS. 7 and 8 illustrate a task of attaching an upper facesheet to an upper end of a core according to different embodiments of the present disclosure.

With reference to the embodiment illustrated in FIG. 7, the method may also include a task of removing unpolymerized photo-monomer 108 from the reservoir 107, thereby leaving the polymer optical waveguides 105 defining the open cellular ordered three-dimensional micro-structure core 104 (i.e., the method may include a task of removing the photo-monomer 108 from the reservoir 107 that was not polymerized into polymer optical waveguides 105 during the task of irradiating the volume of liquid photo-monomer 108 in the reservoir 107 with collimated light beams 112). The task of removing the unpolymerized photo-monomer 108 from the reservoir 107 may be performed by any suitable process, such as, for instance, applying a solvent that dissolves the unpolymerized photo-monomer 108 but not the polymer optical waveguides 105. The method may also include a task of removing the mask 110 and the reservoir 107 following the task of irradiating the volume of photo-monomer 108 with one or more collimated light beams 112.

With continued reference to the embodiment illustrated in FIG. 7, the method also includes a task of attaching the upper facesheet 102 to an upper surface 121 of the open cellular ordered three-dimensional polymer microstructure core 104 (i.e., a task of attaching the upper facesheet 102 to an upper end of the polymer optical waveguides 105). The task of attaching the upper facesheet 102 to the upper surface of the core 104 may be performed by any suitable process, such as, for instance, welding (e.g., inert gas welding, linear friction welding, vibration welding, or friction-stir welding), brazing, adhering, bonding, or any combination thereof. The upper facesheet 102 may have any suitable shape, such as, for instance, square, rectangular, circular, or even an irregular shape. The upper facesheet 102 may have any suitable thickness, such as, for instance, from approximately or about 0.03 inches to approximately or about 0.25 inches, depending upon the intended application of the sandwich structure 101. Although the upper facesheet 102 in the illustrated embodiment is flat, in one or more alternate embodiments the upper facesheet 102 may be non-planar. Additionally, the upper facesheet 102 may be formed from any suitable material, such as, for instance, aluminum, steel, other metal alloys, carbon fiber reinforced plastic, unreinforced plastic, or any combination thereof. In one embodiment, the upper facesheet 102 defines one or more apertures 122 (e.g., holes) axially aligned with the one or more captive fasteners 100 (i.e., the method may include a task of selecting an upper facesheet 102 having one or more preformed apertures 122 configured to align with the one or more captive fasteners 100). In another embodiment, the method may include a task of forming one or more apertures 122 in the upper facesheet 102 aligned with the one or more captive fasteners 100 after the upper facesheet 102 has been attached to the upper surface 121 of the core 104. The task of forming the one or more apertures 122 in the upper facesheet 102 may be performed by any suitable process, such as, for instance, machining (e.g., drilling, laser cutting, or water jet cutting).

In an embodiment in which the captive fasteners 100 are internally threaded fasteners (e.g., internally threaded inserts), as illustrated in FIG. 7, the apertures 122 in the upper facesheet 102 may be smaller than the outer diameter of the captive fasteners 100. In another embodiment in which the captive fasteners 100 are internally threaded fasteners, the diameter of the apertures 122 in the upper facesheet 102 may be greater than or substantially equal to an inner diameter of the internally threaded captive fasteners 100. In an embodiment in which the captive fasteners 100 are externally threaded fasteners (e.g., externally threaded inserts or studs), as illustrated in FIG. 8, the apertures 122 in the upper facesheet 102 are larger than the outer diameter of the captive fasteners 100 to enable the attachment of additional internally threaded fasteners to the external threads of the captive fasteners 100, such as, for instance, to attach the sandwich structure 101 to another structural component or subsystem.

Figure 8:
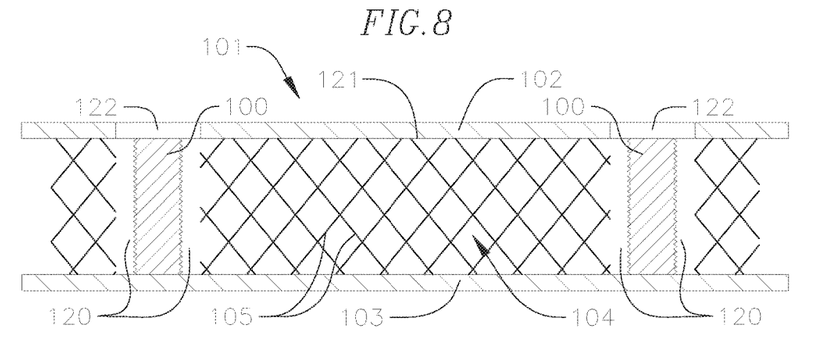
Figure 9:
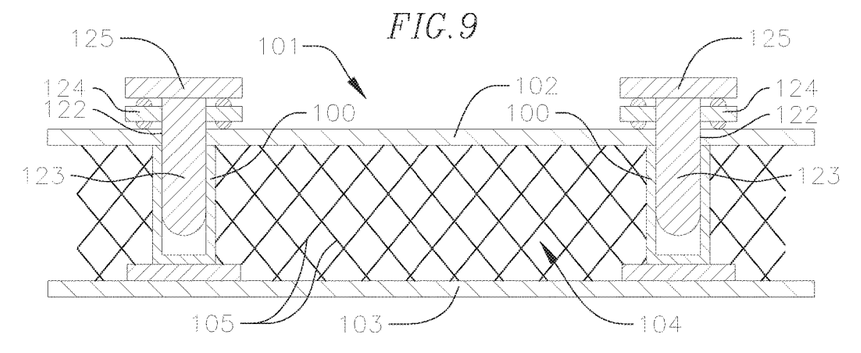
FIG. 9 illustrates a task of sealing the fasteners in a sandwich structure according to one embodiment of the present disclosure.

With reference now to the embodiment illustrated in FIG. 8, the method may also include a task of sealing a periphery of the sandwich structure 101 (i.e., creating a liquid-tight seal extending between the upper and lower facesheets 102, 103 and around the entire periphery of the sandwich structure 101). The task of sealing the periphery of the sandwich structure 101 may be performed by any suitable process. Suitable methods for sealing the periphery of the sandwich structure 101 are described in co-pending U.S. patent application Ser. No. 14/197,043, entitled "Open Cellular Sandwich Structures Having Sealed Edges and Methods of Manufacturing the Same," filed on Mar. 4, 2014, the entire content of which is incorporated herein by reference. In one embodiment, the apertures 122 in the upper facesheet 102 may be temporarily sealed during the task of sealing the periphery of the sandwich structure 101 to prevent the introduction of any material, such as epoxy, into or on the captive fasteners 100. Otherwise, the introduction of foreign matter, such as epoxy, onto the captive fasteners 100 may interfere or prevent the attachment of other fasteners to the captive fasteners 100 in the core 104. In one embodiment, the task of sealing the apertures 122 in upper facesheet 102 may include installing a fastener 123 and a pressure sealing washer 124 into or onto each of the captive fasteners 100 in the core 104. As illustrated in FIG. 9, the head 125 of each fastener 123 is configured to compress the pressure sealing washer 124 against the upper facesheet 102 to create a liquid-tight seal around the apertures 122 in the upper facesheet 102.

The sandwich structures 101 formed according to the method described above may be integrated into any desired structure, such as, for instance, aerospace or automotive vehicles. For example, the sandwich structures 101 of the present disclosure may be incorporated into automobile crush cans, door panels, and outer mold line aircraft components. The sandwich structures 101 of the present disclosure may be used as structural members. Additionally, because the open cellular microstructure core 104 is configured to permit fluid to flow through the core 104, the sandwich structures 101 of the present disclosure may also be used to perform additional functions, such as, for instance, acoustic isolation, active heating, active cooling, or fluid storage (e.g., a structural fuel tank). Additionally, because the lower facesheet 103 of the embodiment of the sandwich structure 101 illustrated in FIG. 9 includes a continuous, smooth surface (i.e., a continuous surface unbroken by a fastener), the sandwich structure 101 may be suitable for applications requiring a smooth surface, such as for aerodynamic, sealing, or stylistic reasons (e.g., an aircraft outer mold line or an automotive exterior).

Figure 10:
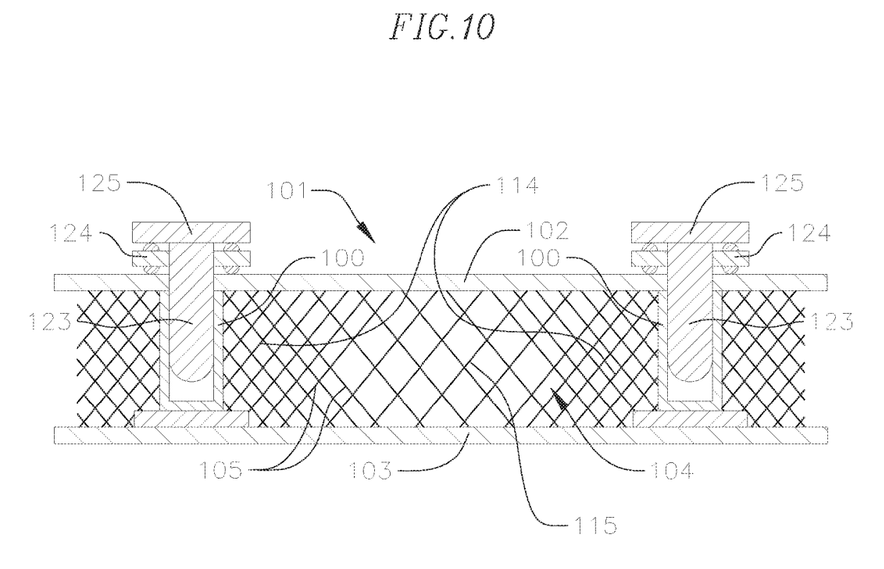
FIG. 10 illustrates a sandwich structure according to one embodiment of the present disclosure with one or more regions of higher polymer waveguide density surrounding one or more of the captive fasteners.

With reference now to the embodiment illustrated in FIG. 10, the sandwich structure 101 formed according to the method described above contains one or more higher density regions 114 of polymer optical waveguides 105 surrounding the one or more captive fasteners 100. These one or more higher density regions 114 serve to increase the stiffness and strength of the reinforcing core 104 in the vicinity of the fasteners 125 where increased mechanical loading may occur. In one embodiment, the core 104 may be strengthened around each of the captive fasteners 100, although in one or more alternate embodiments, the core 104 may be strengthened around less than all of the captive fasteners 100, such as, for instance, around only those captive fasteners 100 that are expected to transmit mechanical loads exceeding a certain threshold.

The present disclosure is also directed to various methods for embedding one or more through fasteners 200 into a sandwich structure 201 having an upper facesheet 202, a lower facesheet 203 spaced apart from the upper facesheet 202, and a reinforcing core 204 disposed between the upper and lower facesheets 202, 203, respectively. The through fasteners 200 in these methods pass through both the lower facesheet 203 and the upper facesheet 202 of the sandwich structure 201. The reinforcing core 204 is an open cellular ordered three-dimensional polymer microstructure having a plurality of interconnected polymer optical waveguides 205. As described in detail below, the sandwich structure 201 and the through fasteners 200 are configured to enable fasteners to pass through both the upper and lower facesheets 202, 203 and the through fasteners 200 in the core 204, such as, for instance, to attach the sandwich structure 201 to another structural component or subsystem.

Figure 11:
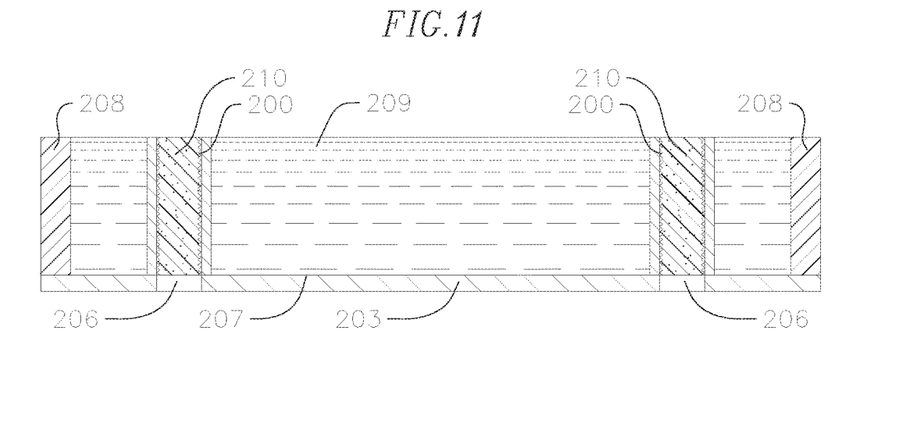
FIG. 11 illustrates a task of attaching one or more through fasteners to a lower facesheet and a task of filling a reservoir with a volume of liquid photo-monomer according to one embodiment of the present disclosure.

With reference now to the embodiment illustrated in FIG. 11, the method may include a task of selecting a lower facesheet 203 having one or more preformed apertures 206. The method also includes a task of aligning the one or more through fasteners 200 with the one or more apertures 206 in the lower facesheet 203 and attaching the one or more through fasteners 200 to an inner surface 207 of the lower facesheet 203. In an alternate embodiment, the method may include attaching the one or more through fasteners 200 to the lower facesheet 203 and then forming one or more apertures 206 in the lower facesheet 203 that are aligned (e.g., concentric) with the one or more through fasteners 200. The through fasteners 200 may be any suitable kind of fastener, such as, for instance, standoffs (e.g., internally threaded standoffs, externally threaded standoffs, or smooth walled cylindrical tubes). The task of attaching the one or more through fasteners 200 to the lower facesheet 203 may be performed by any suitable process, such as, for instance, welding (e.g., inert gas welding, stick welding, arc welding, ultrasonic welding, linear friction welding, vibration welding, or friction-stir welding), brazing, adhering, bonding, or any combination thereof. In one embodiment in which the through fasteners 200 are externally threaded standoffs, the through fasteners 200 may be threaded into the apertures 206 in the lower facesheet 203. In one embodiment, the through fasteners 200 may include serrated edges configured to aid in securing the through fasteners 200 to the lower facesheet 203.

With continued reference to the embodiment illustrated in FIG. 11, the method of embedding the one or more through fasteners 200 in the sandwich structure 201 also includes a task of forming a mold or reservoir 208 around a periphery of the lower facesheet 203 and filling the reservoir 208 with a volume of liquid photo-monomer 209 that is configured to polymerize when exposed to light within a particular range of wavelengths, such as, for instance, ultraviolet light (i.e., wavelengths between 250 nm and 400 nm). The liquid photo-monomer 209 may be any suitable monomer configured to polymerize when exposed to light, such as, for instance, urethanes (e.g., polyurethanes), acrylates, methacrylates, or cationic polymers (e.g., photo-cured epoxies). In one embodiment, the method also includes a task of temporarily sealing each of the through fasteners 200 with a sealing compound 210, such as, for instance, silicone grease or wax, to prevent the liquid photo-monomer 209 from leaking out of the reservoir 208 through the through fasteners 200.

Figure 12:
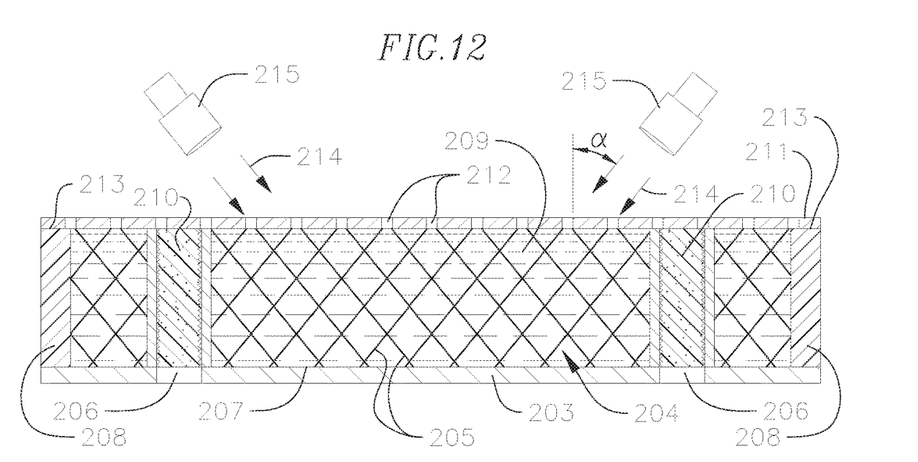
FIG. 12 illustrates a task of irradiating a volume of liquid photo-monomer with one or more light beams according to one embodiment of the present disclosure.

With reference now to the embodiment illustrated in FIG. 12, the method also includes a task of selecting a mask 211 having a desired shape, arrangement, and quantity of apertures 212 and covering an upper end 213 of the reservoir 208 with the selected mask 211. As described above, the apertures 212 in the mask 211 may have any suitable shape based upon the desired cross-section shape of the polymer optical waveguides 205, such as, for instance, triangular, pentagonal, hexagonal, polygonal, oval, or star-shaped. Additionally, as described above, the apertures 212 in the mask 211 may have any suitable arrangement depending upon the desired configuration of the polymer optical waveguides 205. The method may include selecting a mask 211 having apertures 212 that are more closely spaced around the one or more through fasteners 200, such as, for instance, a mask 211 that is the same or similar to the mask 104 illustrated in FIG. 3.

Still referring to the embodiment illustrated in FIG. 12, the method also includes a task of irradiating the volume of photo-monomer 209 in the reservoir 208 by directing one or more collimated light beams 214 (e.g., ultraviolet light beams) from one or more light sources 215 through the one or more apertures 212 in the mask 211. As described above, irradiating the photo-monomer 209 causes the photo-monomer 209 to polymerize and thereby form the polymer optical waveguides 205. In one embodiment, the polymer optical waveguides 205 propagate through the volume of photo-monomer 209 in the reservoir 208 and adhere to an outer surface of one or more of the through fasteners 200. In this manner, the polymer optical waveguides 205 are coupled to the one or more through fasteners 200 (i.e., the open cellular ordered three-dimensional polymer microstructure core 204 is coupled to the one or more through fasteners 200). Additionally, the polymer optical waveguides 205 may be formed by one or more fixed position light sources 215 arranged to direct light beams 214 at different incident angles, one or more repositionable light sources 215, or a combination of fixed and repositionable light sources 215.

In one embodiment, the method includes a task of creating one or more relatively higher density regions 216 (see FIG. 15) of polymer optical waveguides 205 surrounding the one or more through fasteners 200 and one or more relatively lower density regions 217 (see FIG. 15) of polymer optical waveguides 205 spaced apart from the through fasteners 200 (i.e., a task of creating a core 204 wherein localized regions 216 of the core 204 surrounding the through fasteners 200 have a higher density of polymer waveguides 205 than other regions 217 of the core 204). As described above, the relatively higher density regions 216 surrounding the through fasteners 200 may be formed by selecting a mask 211 having apertures 212 that are more closely spaced around the one or more through fasteners 200 and directing one or more light beams 214 through each of the apertures 212, selecting a mask 211 having a uniform, equidistant pattern of apertures 212 and directing a greater number of collimated light beams 214 through the apertures 212 around the one or more through fasteners 200 than through the other apertures 212 in the mask 211, or a combination of selecting a mask 211 having apertures 212 that are more closely spaced around the one or more through fasteners 200 and directing a greater number of light beams 214 through the apertures 212 surrounding the one or more through fasteners 200. In another embodiment, the task of creating the one or more higher density regions 216 of polymer optical waveguides 205 surrounding the captive fasteners 200 may include changing the orientation a of the collimated light beams 214 through the apertures 212 of the mask 211 in the vicinity of one or more of the fasteners 200.

Figure 13:
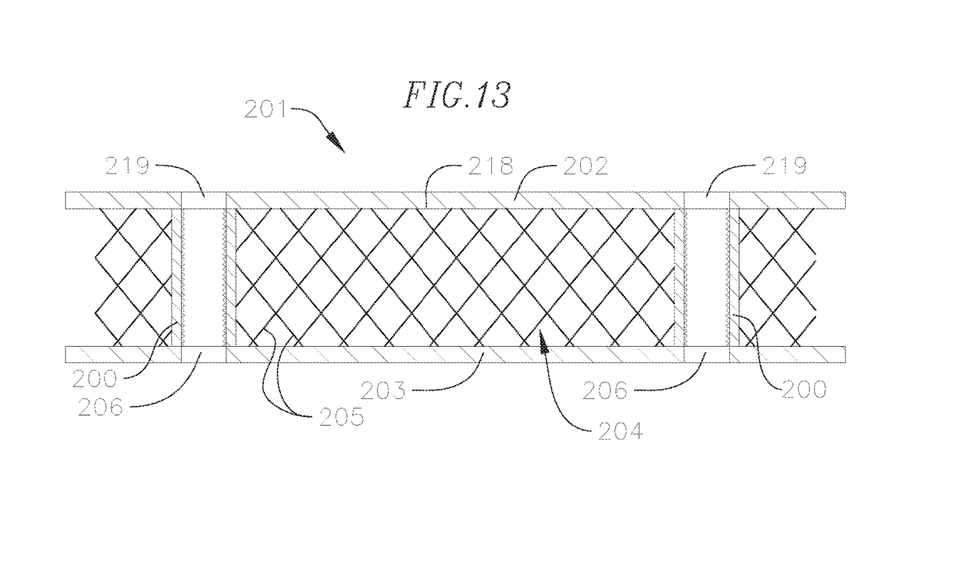
FIG. 13 illustrates a task of attaching an upper facesheet to an upper end of a core according to another embodiment of the present disclosure.

With reference now to the embodiment illustrated in FIG. 13, the method also includes a task of removing the unpolymerized photo-monomer 209 from the reservoir 208, thereby leaving the polymer optical waveguides 205 defining the open cellular ordered three-dimensional micro-structure core 204. The unpolymerized photo-monomer 209 may be removed from the reservoir 208 by any suitable process, such as, for instance, applying a solvent that dissolves the unpolymerized photo-monomer 209 but not the polymer optical waveguides 205. The method may also include a task of removing the mask 211 and the reservoir 208 following the task of irradiating the photo-monomer 209 with collimated light beams 214. The method also includes a task of removing the sealing compound 210 from each of the through fasteners 200.

With continued reference to the embodiment illustrated in FIG. 13, the method also includes a task of attaching the upper facesheet 202 to an upper surface 218 of the open cellular ordered three-dimensional polymer microstructure core 204 by any suitable process, such as, for instance, welding (e.g., inert gas welding, linear friction welding, vibration welding, or friction-stir welding), brazing, adhering, bonding, or any combination thereof. In one embodiment, the upper facesheet 202 defines one or more apertures 219 axially aligned with the one or more through fasteners 200 and the apertures 206 in the lower facesheet 203. As described above, the method may include either selecting an upper facesheet 202 having one or more preformed apertures 219 configured to align with the respective one or more through fasteners 200 or forming one or more apertures 219 in the upper facesheet 202 aligned with the respective one or more through fasteners 200 after the upper facesheet 202 has been attached to the upper surface 218 of the core 204.

Figure 14:
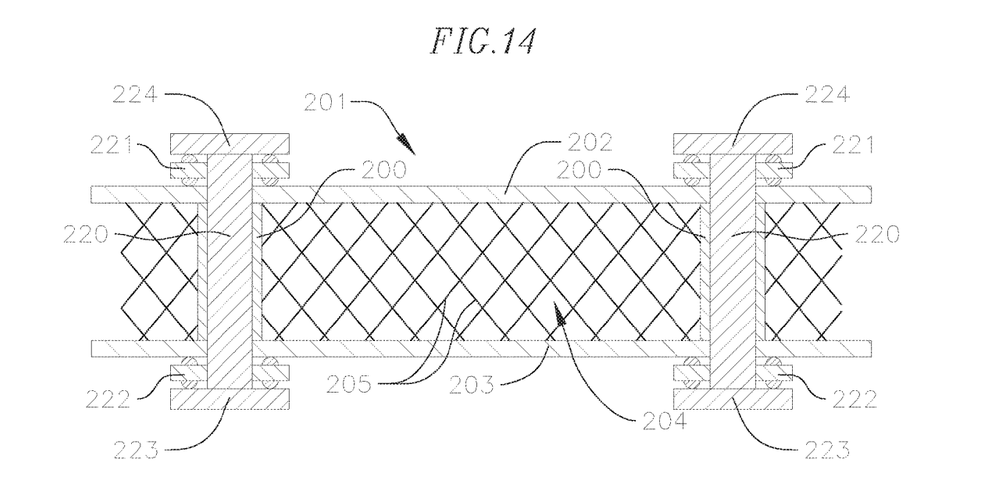
FIG. 14 illustrates a task of sealing the fasteners in a sandwich structure according to one embodiment of the present disclosure.

With reference now to the embodiment illustrated in FIG. 14, the method may also include a task of creating a liquid-tight seal around a periphery of the sandwich structure 201 by any suitable process, such as those processes described in co-pending U.S. patent application Ser. No. 14/197,043, entitled "Open Cellular Sandwich Structures Having Sealed Edges and Methods of Manufacturing the Same" and filed on Mar. 4, 2014, the entire content of which is incorporated herein by reference. In one embodiment, the apertures 219, 206 in the upper and lower facesheets 202, 203, respectively, may be temporarily sealed during the task of sealing the periphery of the sandwich structure 201 to prevent the introduction of any material, such as epoxy, into the through fasteners 200, which might otherwise interfere with or prevent the attachment of other fasteners to the through fasteners 200. In one embodiment, illustrated in FIG. 14, the task of sealing the apertures 219, 206 in the upper and lower facesheets 202, 203 may include temporarily installing a fastener 220, a pair of pressure sealing washers 221, 222, and a threaded nut 223 into each of the through fasteners 200 in the core 204. In the illustrated embodiment, the head 224 of each fastener 220 is configured to compress the upper pressure sealing washer 221 against the upper facesheet 202 to create a liquid-tight seal around each of the apertures 219 in the upper facesheet 202, and each of the threaded nuts 223 is configured to compress the lower pressure sealing washer 222 against the lower facesheet 203 to create a liquid-tight seal around each of the apertures 206 in the lower facesheet 203.

The sandwich structures 201 formed according to the method described above may be integrated into another structure or subsystem, such as, for instance, in an aerospace or automotive vehicle, by passing a second fastener 220 through each of the through fasteners 200 in the core 204 and through the aligned apertures 219, 206 in the upper and lower facesheets 202, 203, respectively. In an embodiment in which the through fasteners 200 in the core 204 are smooth-walled cylindrical standoffs, the fasteners 220 connecting the sandwich structure 201 to another structure or subsystem may be shoulder bolts. In an embodiment in which the through fasteners 200 in the core 204 are internally threaded standoffs, the fasteners 220 connecting the sandwich structure 201 to another structure or subsystem may be fully threaded bolts or screws. It will be appreciated, however, that any other suitable type of fastener may be used to connect the sandwich structure 201 to another structure or subsystem.

Figure 15:
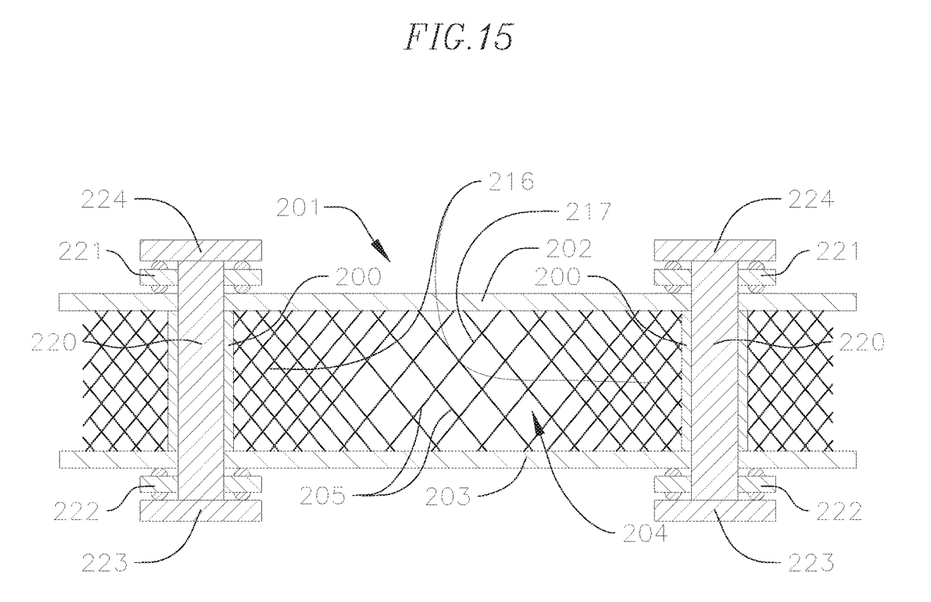
FIG. 15 illustrates a sandwich structure according to one embodiment of the present disclosure with one or more regions of higher polymer waveguide density surrounding one or more of the through fasteners.

With reference now to the embodiment illustrated in FIG. 15, the sandwich structure 201 formed according to the method described above contains one or more higher density regions 216 of polymer optical waveguides 205 surrounding the one or more through fasteners 200. These one or more higher density regions 216 serve to increase the stiffness and strength of the reinforcing core 204 in the vicinity of the fasteners 200 where increased mechanical loading may occur. In one embodiment, the core 204 may be strengthened around each of the through fasteners 200, although in one or more alternate embodiments, the core may be strengthened around less than all of the through fasteners 200, such as, for instance, around only those through fasteners 200 that are expected to transmit mechanical loads exceeding a certain threshold.

While this invention has been described in detail with particular references to exemplary embodiments thereof, the exemplary embodiments described herein are not intended to be exhaustive or to limit the scope of the invention to the exact forms disclosed. Persons skilled in the art and technology to which this invention pertains will appreciate that alterations and changes in the described structures and methods of assembly and operation can be practiced without meaningfully departing from the principles, spirit, and scope of this invention, as set forth in the following claims. Although relative terms such as "outer," "inner," "upper," "lower," "below," "above," "vertical," "horizontal," and similar terms have been used herein to describe a spatial relationship of one element to another, it is understood that these terms are intended to encompass different orientations of the various elements and components of the invention in addition to the orientation depicted in the figures. Additionally, as used herein, the term "substantially," "about," and similar terms are used as terms of approximation and not as terms of degree, and are intended to account for the inherent deviations in measured or calculated values that would be recognized by those of ordinary skill in the art. Furthermore, as used herein, when a component is referred to as being "on" another component, it can be directly on the other component or components may also be present therebetween. Moreover, when a component is component is referred to as being "coupled" to another component, it can be directly attached to the other component or intervening components may be present therebetween.

What is claimed is:

1. A sandwich structure, comprising:
at least one fastener attached to a first facesheet;
an open cellular ordered three-dimensional lattice microstructure core defined by a plurality of interconnected optically polymerized polymer waveguides around the at least one fastener and attached to the first facesheet; and
a second facesheet attached to the open cellular ordered three-dimensional lattice microstructure core, wherein the open cellular ordered three-dimensional lattice microstructure core is sandwiched between the first facesheet and the second facesheet.

2. The sandwich structure of claim 1, wherein the open cellular ordered three-dimensional lattice microstructure core has a first region defined by a first density of interconnected optically polymerized polymer waveguides surrounding the at least one fastener and a second region defined by a second density of interconnected optically polymerized polymer waveguides.

3. The sandwich structure of claim 1, wherein the open cellular ordered three-dimensional lattice microstructure core is coupled to the at least one fastener.

4. The sandwich structure of claim 1, wherein the at least one fastener is an externally threaded stud.

5. The sandwich structure of claim 4, wherein the open cellular ordered three-dimensional lattice microstructure core is separated from the externally threaded stud by a void around the externally threaded stud.

6. The sandwich structure of claim 1, wherein the at least one fastener is an internally threaded insert.

7. The sandwich structure of claim 1, wherein the first facesheet comprises at least one first aperture aligned with the at least one fastener.

8. The sandwich structure of claim 7, wherein the second facesheet comprises at least one second aperture aligned with the at least one fastener.

9. A sandwich structure, comprising:
at least one fastener attached to a first facesheet;
an ordered three-dimensional microstructure core defined by a plurality of interconnected polymer waveguides around the at least one fastener and attached to the first facesheet; and
a second facesheet attached to the ordered three-dimensional microstructure core, wherein the ordered three-dimensional microstructure core is sandwiched between the first facesheet and the second facesheet, and
wherein the three-dimensional microstructure core has a first region defined by a first angular orientation of interconnected polymer optical waveguides surrounding the at least one fastener and a second region defined by a second angular orientation of interconnected polymer optical waveguides different than the first angular orientation.

* * * * *